US012090490B2

(12) United States Patent
Ku

(10) Patent No.: US 12,090,490 B2
(45) Date of Patent: Sep. 17, 2024

(54) APPARATUS FOR PROCESSING WASTE BATTERY

(71) Applicant: Bonhun Ku, Seongnam-si (KR)

(72) Inventor: Bonhun Ku, Seongnam-si (KR)

( * ) Notice: Subject to any disclaimer, the term of this patent is extended or adjusted under 35 U.S.C. 154(b) by 64 days.

(21) Appl. No.: 17/841,722

(22) Filed: Jun. 16, 2022

(65) Prior Publication Data
US 2022/0401963 A1  Dec. 22, 2022

(30) Foreign Application Priority Data

Jun. 16, 2021 (KR) .................. 10-2021-0078160
Jul. 2, 2021 (KR) .................. 10-2021-0086952

(51) Int. Cl.
*B03B 9/06* (2006.01)
*B03B 1/04* (2006.01)
*H01M 10/54* (2006.01)

(52) U.S. Cl.
CPC .................. *B03B 9/06* (2013.01); *B03B 1/04* (2013.01); *H01M 10/54* (2013.01); *B03B 2009/066* (2013.01)

(58) Field of Classification Search
CPC .. B03B 1/04; B03B 9/06; B03B 9/061; B03B 2009/066; H01M 10/54; H01M 6/52
See application file for complete search history.

(56) References Cited

U.S. PATENT DOCUMENTS

| | | | |
|---|---|---|---|
| 5,456,992 A | 10/1995 | Elliott | |
| 2010/0230518 A1* | 9/2010 | Ewles | B03B 9/061 241/23 |
| 2012/0305684 A1 | 12/2012 | Bhandari | |

FOREIGN PATENT DOCUMENTS

| | | | |
|---|---|---|---|
| CN | 210230167 U | 4/2020 | |
| EP | 0247023 A1 | 11/1987 | |
| WO | WO-2015195397 A1 * | 12/2015 | ............. B01J 19/06 |

OTHER PUBLICATIONS

Search Report issued in connection with corresponding European application No. 22166791.8-1103 dated Feb. 3, 2023.
Search Report issued in connection with corresponding Application No. EP 22166791.8 dated Oct. 4, 2022.
Georgi-Maschler T. et al: "Development of a recycling process for Li-ion batteries", Journal of Power Sources, vol. 207, Jun. 1, 2012 (Jun. 1, 2012 ), pp. 173-182, XP055910047, Amsterdam, NL ISSN: 0378-7753, DOI: 10.1016/j.jpowsour.2012.01.152.

* cited by examiner

*Primary Examiner* — Michael McCullough
*Assistant Examiner* — Kalyanavenkateshware Kumar
(74) *Attorney, Agent, or Firm* — Tarolli, Sundheim, Covell & Tummino LLP

(57) ABSTRACT

An apparatus for processing a waste battery is proposed. The apparatus includes a conveying unit having a conveying belt rotated by a plurality of rotating shafts which are rotated to convey the supplied waste battery in one direction, a pulverizer disposed on a position along a travelling direction of the conveying unit to pulverize the waste battery, a heater disposed on a downstream side of the pulverizer to heat dust formed by the pulverizer, a collector collecting the dust which passes through the pulverizer and the heater, a filter part filtering a pulverized material of the collector, a mixer supplying an additive to the dust discharged from a discharge pipe of the filter part, and a compressor compressing a mixture mixed in the mixer.

9 Claims, 5 Drawing Sheets

APPARATUS FOR PROCESSING WASTE BATTERY

CROSS REFERENCE TO RELATED APPLICATION

The present application claims priorities to Korean Patent Application No. 10-2021-0078160, filed Jun. 16, 2021, and Korean Patent Application No. 10-2021-0086952, filed Jul. 2, 2021, the entire contents of which are incorporated herein for all purposes by this reference.

BACKGROUND OF THE INVENTION

Field of the Invention

The present disclosure relates to an apparatus for processing a waste battery. More particularly, the present disclosure relates to an apparatus for processing a waste battery, which can minimize the diffusion of dust, generated during processing of the waste battery, to the surroundings.

Description of the Related Art

Generally, a lithium-ion rechargeable battery is used in automotive, home appliance, and industrial energy storage applications, and the use of the battery is gradually increasing.

However, only approximately 5% of waste batteries whose service life has expired are recycled around the world.

In particular, since lithium-ion batteries are applied to electromobility applications such as electric vehicles, it is expected that more than 11 million tons of lithium ion battery packs with expired service lives will be discarded.

Since the lithium-ion battery packs whose service lives have expired contain valuable metals such as cobalt, lithium, copper, graphite, nickel, aluminum, and manganese, waste batteries whose service lives have expired may be used as an advanced urban mining source for lithium and many other valuable metals.

Accordingly, a current waste-battery recycling method is mainly performed by smelting or dry smelting for recovering metal alloys (typically cobalt, copper and nickel).

However, recycling facilities using the dry smelting have a problem that fine dust or dust of pulverized waste battery is contained in the air and contains harmful components that may be accumulated in the lungs of workers, as well as components that cause environmental pollution.

Documents of Related Art (Patent Document 1) KR 10-1574641 (Dec. 4, 2015)
(Patent Document 2) KR 10-1831260 (Feb. 22, 2018)

SUMMARY OF THE INVENTION

Accordingly, the present disclosure has been made keeping in mind the above problems occurring in the related art, and an objective of the present disclosure is to provide an apparatus for processing a waste battery, which can minimize the diffusion of dust, generated during processing of the waste battery, to the surroundings, and can collect black powder, thus improving a recovery rate.

In order to achieve the objective of the present disclosure, the present disclosure provides an apparatus for processing a waste battery, the apparatus including a conveying unit having a conveying belt rotated by a plurality of rotating shafts which are rotated to convey the supplied waste battery in one direction, a pulverizer disposed on a position along a travelling direction of the conveying unit to pulverize the waste battery, a heater disposed on a downstream side of the pulverizer to heat dust formed by the pulverizer, a collector collecting the dust which passes through the pulverizer and the heater, a filter part filtering a pulverized material of the collector, a mixer supplying an additive to the dust discharged from a discharge pipe of the filter part, and a compressor compressing a mixture mixed in the mixer.

The collector may be formed in a duct structure having an internal flow space above the pulverizer, the heater, and the filter part, and be provided with a branch pipe communicating with the pulverizer, the heater, and the filter part which are sequentially arranged in a longitudinal direction.

The compressor may communicate with the mixer along a discharge pipe extending from the filter part.

The compressor may include an upper member disposed on an upper side and reciprocating up and down to compress the dust, and a lower member disposed on an opposite side of the upper member to support the dust from a lower side.

The mixer may spray an additive containing at least one of a binder or a diluent or a mixture thereof into the dust contained therein.

The diluent may include de-aromatic hydrocarbon.

The present disclosure provides an apparatus for processing a waste battery, the apparatus including a collector collecting dust of a pulverized waste battery, and a mixer mixing an additive with the dust discharged from the collector, and the mixer may be controlled to have a preset mixer rpm and a preset mixing amount.

The preset pressure may range from 0.5 to 3.0 t/cm$^2$.

The preset mixing amount may be a mixing amount of a diluent and a binder, and the preset mixing amount may range from 5 to 30%.

The preset mixer rpm may range from 100 to 500 rpm.

The present disclosure provides an apparatus for processing a waste battery, the apparatus including a receiving part receiving a pulverized material therein, a sorting chamber communicating with the receiving part, and having a space therein, a filter member formed in a mesh structure in the sorting chamber, and having a hollow portion in which the pulverized material discharged from the receiving part flows in a longitudinal direction, with a first end thereof in the longitudinal direction communicating with the receiving part, a current-collecting-material capture unit communicating with a second end of the filter member in the longitudinal direction and capturing a current collecting material contained in the pulverized material, a plurality of outlets formed to discharge the dust to an outside of the sorting chamber, a dust flow line communicating with the outlets, and a dust collecting part communicating with the dust flow line and disposed under the receiving part.

The filter member may be obliquely formed in the sorting chamber.

The filter member may be rotatably disposed.

A corrugated pipe may be formed on each of opposite ends in the longitudinal direction of the filter member.

The apparatus may further include a suction member disposed to overlap in the longitudinal direction of the filter member.

The apparatus may further include an airflow generating device disposed under the filter member to generate a flow of air towards the filter member.

The apparatus may further include a dust collecting part formed under the filter member so that dust generated from the pulverized material passing through an interior of the filter member is dropped and collected in the sorting chamber.

A collected-dust outlet may be formed to discharge dust from the dust collecting part, the collected-dust outlet being merged into the dust flow line.

According to an embodiment of the present disclosure, an apparatus for processing a waste battery is configured such that the dust of pulverized waste battery flows through a collector and a filter part communicating directly with each other to a mixer, thus preventing the dust from being scattered to the surroundings, and thereby improving poor working environment caused by fine dust generated during a process.

Further, since dust passing through a collector and a filter part is mixed with an additive in a mixer, a cohesive force can be improved.

Furthermore, if a diluent is added as an additive, the diluent required for a subsequent process is used to prevent dust, so the diluent can be used as it is without being removed in the subsequent process. In this case, the diluent prevents dust from occurring through power agglomeration, simultaneously formability can be increased, and the number of processes can be reduced because it is unnecessary to remove the diluent in the subsequent process.

Since dust agglomerated in a mixer is immediately compressed and formed into a block, a recovery process is facilitated to solve a low yield problem. In addition, since compressed blocks may be stacked, moving and sales thereof are easy.

DETAILED DESCRIPTION OF THE INVENTION

Figure 1:
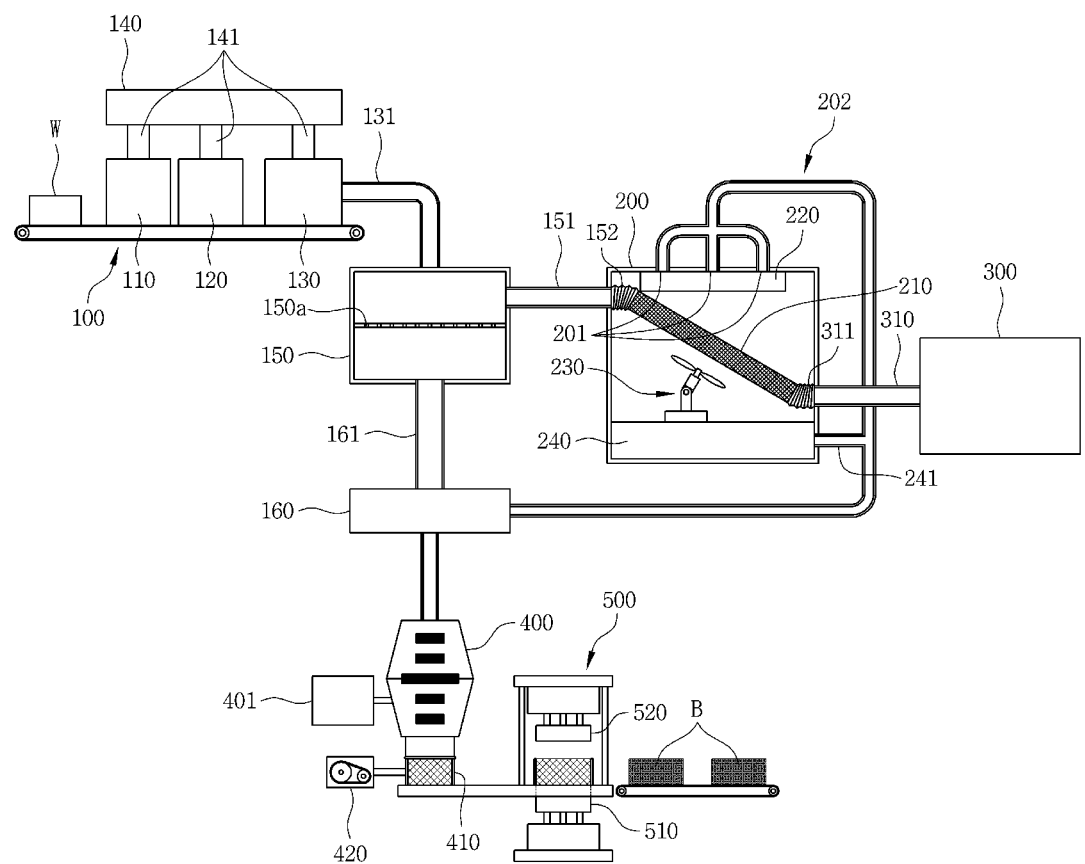
FIG. 1 is a view schematically illustrating an apparatus for processing a waste battery according to an embodiment of the present disclosure.

The above and other objectives, features, and other advantages of the present disclosure will be more clearly understood from the following detailed description when taken in conjunction with the accompanying drawings. However, the present disclosure may be embodied in different forms without being limited to the embodiments set forth herein. Rather, the embodiments disclosed herein are provided to make the disclosure thorough and complete and to sufficiently convey the spirit of the present disclosure to those skilled in the art.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise" and/or "comprising" when used in this specification, specify the presence of stated elements but do not preclude the presence or addition of one or more other elements. The same reference numerals are used throughout the drawings to designate the same or similar components. The terms "and/or" includes each and every combination of one or more of stated elements. It will be understood that, although the terms "first", "second", etc. may be used herein to describe various elements, these elements should not be limited by these terms. These terms are only used to distinguish one element from another element. For instance, a first element discussed below could be termed a second element without departing from the technical idea of the present disclosure.

Unless otherwise defined, all terms including technical and scientific terms used herein have the same meaning as commonly understood by one of ordinary skill in the art to which the present disclosure belongs. It will be further understood that terms used herein will not be interpreted in an idealized or overly formal sense unless expressly so defined herein.

Spatially relative terms "below", "beneath", "lower", "above", "upper", etc. may be used to easily describe a correlation between one element and other elements. The spatially relative terms should be understood as terms including different directions of elements during use or operation in addition to directions shown in the drawings. For example, when an element shown in the drawing is turned upside down, an element described as "below" or "beneath" another element may be placed "above" another element. Accordingly, the exemplary term "below" may include both below and above. An element may also be oriented in a different direction, and thus spatially relative terms may be interpreted according to orientation.

Hereinafter, the preferred embodiment of the present disclosure will be described in detail with reference to the accompanying drawings.

Figure 2:
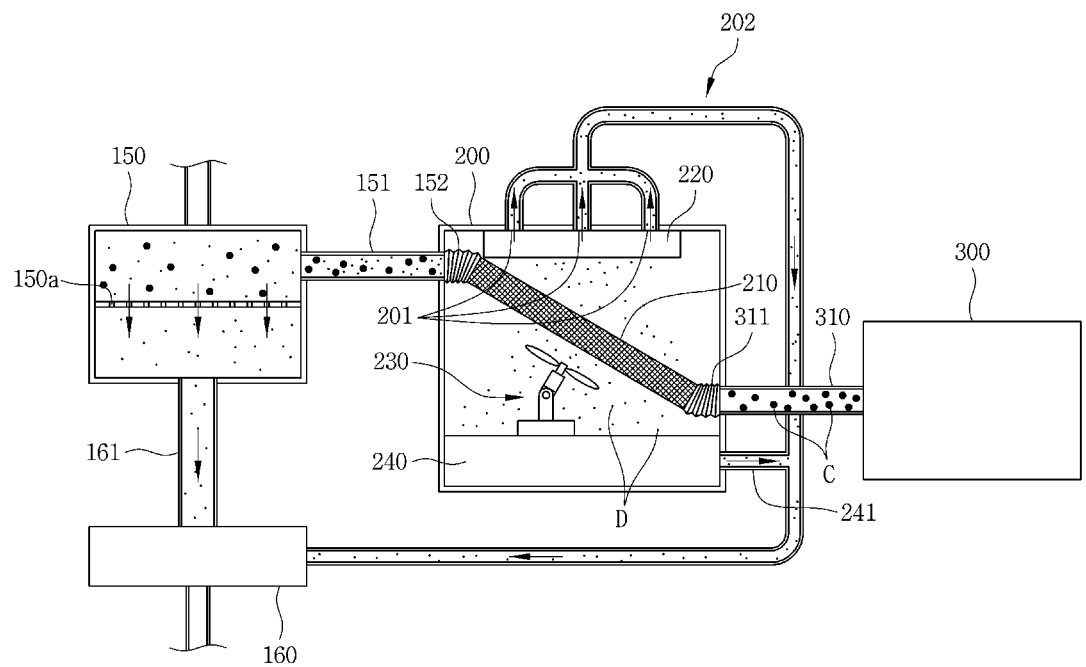
FIG. 2 is a view schematically illustrating the operating state of the interior of a receiving part and a sorting chamber of the apparatus for processing the waste battery according to an embodiment of the present disclosure.
Figure 3:
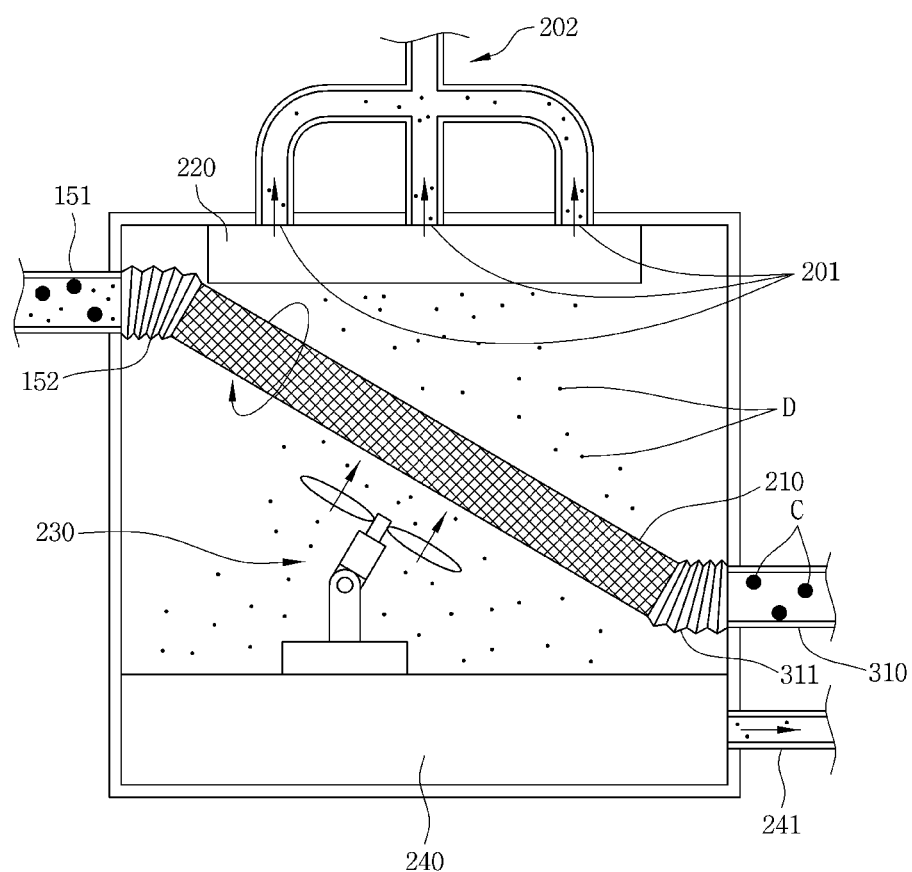
FIG. 3 is an enlarged view illustrating a portion of the sorting chamber of FIG. 2.
Figure 4:
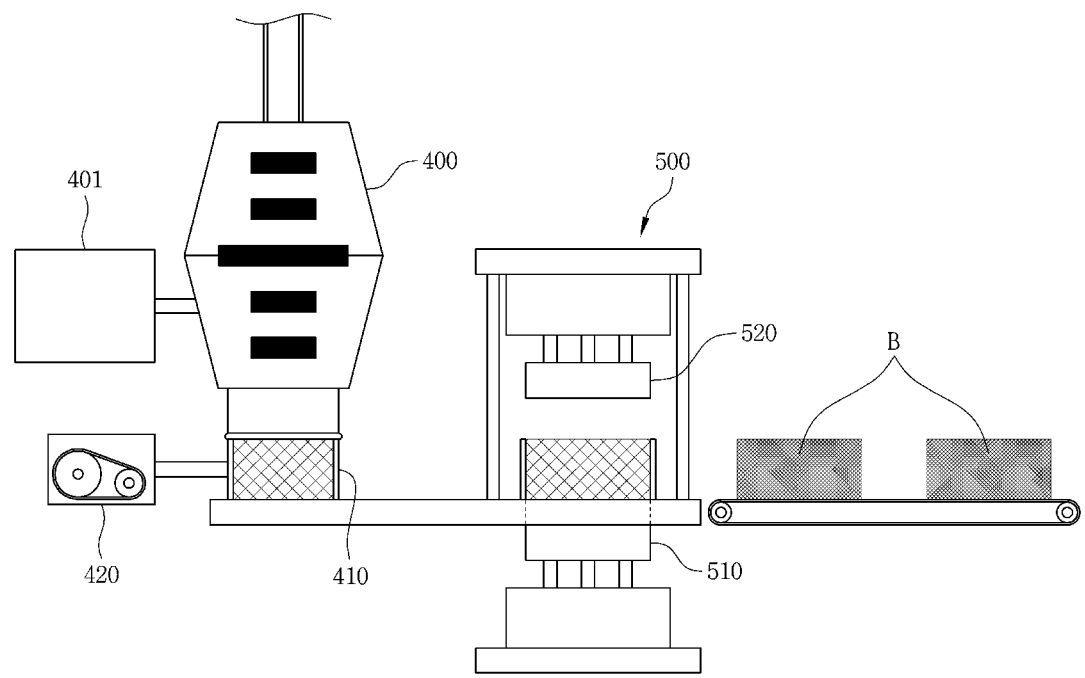
FIG. 4 is an enlarged view illustrating a compression device of FIG. 1.
Figure 5:
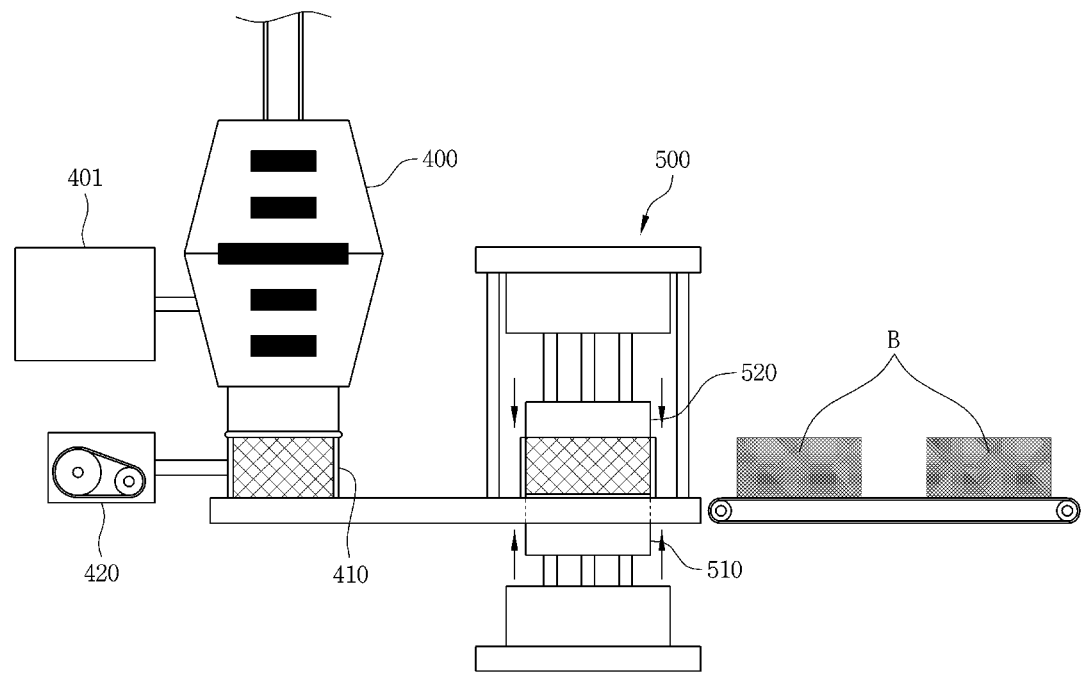
FIG. 5 is a view illustrating a state where the compression device of FIG. 4 is operated.

FIG. 1 is a view schematically illustrating an apparatus for processing a waste battery according to an embodiment of the present disclosure, FIG. 2 is a view schematically illustrating the operating state of the interior of a receiving part and a sorting chamber of the apparatus for processing the waste battery according to an embodiment of the present disclosure, FIG. 3 is an enlarged view illustrating a portion of the sorting chamber of FIG. 2, FIG. 4 is an enlarged view illustrating a compression device of FIG. 1, and FIG. 5 is a view illustrating a state where the compression device of FIG. 4 is operated.

Referring to FIGS. 1 to 5, the apparatus for processing the waste battery according to an embodiment of the present disclosure may include a conveying unit 100, a pulverizer 110, a heater 120, a filter part 130, a receiving part 150, a sorting chamber 200, a filter member 210, a current-collecting-material capture unit 300, a mixer 400, and a compressor 500.

The conveying unit 100 may include at least one pair of driving rollers 101 which are disposed in parallel to be spaced apart from each other by a predetermined length, and a conveying belt 102 which is rotated in one direction by the rotary frictional force of the outer circumference of each driving roller 101.

The driving rollers 101 may be disposed, respectively, on both ends of the conveying belt 102 in a longitudinal direction thereof, or a plurality of rollers may be disposed spaced apart from each other, thus transmitting a driving force to the conveying belt 102.

The pulverizer 110 may be disposed on a position along the traveling direction of the conveying unit 100. Further, a plurality of pulverizing blades (not shown) may be provided to finely pulverize the supplied waste battery W, and may pulverize the waste battery by the frictional force generated in a gap between the intersecting pulverizing blades. For this purpose, a known means such as a hammer mill may be used, but various means for pulverizing the waste battery W may be used, without being limited thereto.

The heater 120 previously heats dust pulverized by the pulverizer 110 at high temperature to improve a cohesive force while the dust passing through the filter part 130 and the compressor 500 which will be described later. For instance, the heat treatment temperature of the heater 120 may be set in the range of 500° C. to 1000° C.

The filter part 130 may be disposed on a downstream side of the heater 120. In this regard, a collector 140 communicating with the pulverizer 110, the heater 120, and the filter part 130 which are sequentially arranged in the longitudinal direction may be provided above the pulverizer 110, the heater 120, and the filter part 130.

The collector 140 performs the function of preventing fine dust from being discharged to the outside. The filter part 130 may communicate with a branch pipe 141 which is formed on the most downstream side of the collector 140.

A discharge pipe 131 may be formed on a rear end of the filter part 130.

The discharge pipe 131 may be formed to communicate with the receiving part 150.

A receiving-part filter 150a that is a filter means may be included in the receiving part 150 to partition the interior of the receiving part 150 and allow fine dust to fall to a dust collecting part 160.

The sorting chamber 200 has a sealed space, and may communicate with the receiving part 150. The internal space of the sorting chamber 200 may refer to a space having a size in which a filter member 210, an airflow generating device 230, a suction member 220, or a dust collecting part 240 which will be described later may be installed.

The filter member 210 formed as a mesh structure is positioned in the sorting chamber 200, has a hollow portion in which a pulverized material discharged from the receiving part 150 flows in the longitudinal direction, and communicates at one end thereof in the longitudinal direction with the receiving part 150. The other end of the filter member 210 in the longitudinal direction thereof may communicate with the current-collecting-material capture unit 300 which will be described later.

The filter member 210 may be formed in the shape of a hollow cylinder, and especially a sidewall thereof forming a circumference may be a mesh structure having a predetermined mesh value. Here, the mesh value of the filter member 210 may be set to prevent the passage of the current collecting material and allow the passage of the dust. The present disclosure is not limited to a specific mesh value.

In other words, the mesh value of the filter member 210 is preferably set to be smaller than the current collecting material C and be larger than the dust D.

Further, a corrugated pipe 152 may be interposed between the filter member 210 and a connection pipe 151 of the receiving part 150. Of course, since any pipe, such as a PVC curved pipe or a straight pipe, for communication between a hollow portion of the filter member 210 and the receiving part 150 may be applied, various structures as well as the corrugated pipe may be applied.

Preferably, the corrugated pipe 152 allows a communicating portion between the filter member 210 and the receiving part 150 to be blocked from the outside, thus preventing dust from being unintentionally diffused.

Furthermore, as will be described later, the corrugated pipe 152 may absorb a predetermined amount of vibration caused by the rotation of the filter member 210. That is, the corrugated pipe 152 having a diameter which repeatedly shrinks and expands in a radial direction may be interposed between the connection pipe 151 of the receiving part 150 and one end of the filter member 210. In addition, although not shown in the drawings, a bearing means for supporting the rotation of the filter member 210 may be included.

Similarly, a corrugated pipe 311 or other various pipes may be interposed in a communicating portion between the other end of the filter member 210 in the longitudinal direction thereof and a connection pipe 310 of the current-collecting-material capture unit 300.

The filter member 210 may be disposed to be rotatable in one direction about a central axis. To this end, a driving force for providing a separate rotating force may be included.

If the filter member 210 rotates, the pulverized material located on the inner circumference of the filter member 210 rises to a predetermined height while being rotated by a predetermined frictional force and then passes through a mesh hole of the filter member 210 by falling energy generated while falling due to a difference in height, thus removing fine dust.

The dust filtered and scattered by the filter member 210 may be guided to the suction chamber 220 installed at an upper position in the sorting chamber 200.

The suction member 220 may be disposed above the filter member 210 to be spaced apart therefrom, and be disposed to overlap in the longitudinal direction of the filter member 210.

The dust introduced into the suction member 220 is discharged through an outlet 201 installed at an upper position outside the sorting chamber 200. Here, the suction member 220 may use a separate motor or other means so as to create a vacuum suction force.

In addition, the airflow generating device 230 may be disposed under the filter member 210 to create the flow of air towards the filter member 210.

The airflow generating device 230 generates the flow of air towards the filter member 210, and accelerates most of the scattered dust D to be intensively sucked into the suction member 220. To this end, the airflow generating device 230 may use a fan for generating the flow of air to one side through rotation or an air compressor using compressed air.

The current-collecting-material capture unit 300 captures only a remaining current collecting material C in a state where dust is scattered and sorted in the suction chamber 220 while the pulverized material moves along the hollow portion of the filter member 210.

Generally, the current collecting material used in the battery employs copper or aluminum having high purity. Thus, if it is possible to perform a capture operation in a state where black powder is purely removed, the material may be recycled without additional cleaning.

A plurality of outlets 201 may be formed so that dust generated while the pulverized material moves along the hollow portion of the filter member 210 may be discharged to the outside of the sorting chamber 200.

The outlets 201 may communicate with a dust flow line 202 so that the discharged dust D flows and is collected in the dust collecting part 160.

The dust flow line 202 may be a moving device using the flow of air by a cyclone dust collector, or a conveyor means supplied with dust which is collected from an upper end of the sorting chamber 200 and then falls therefrom due to its own weight.

In addition, the dust collecting part 240 may be disposed at a lower position of the sorting chamber 200.

The dust collecting part 240 may have an internal space so that dust which is relatively higher in load than dust scattered upwards from the pulverized material flowing through the filter member 210 may fall and be collected.

The dust collected through the dust collecting part 240 may be merged into the above-described dust flow line 202 through a separate collected-dust outlet 241.

The dust D collected in the dust collecting part 160 may be fed into the mixer 400.

In the mixer 400, the dust may be mixed with an additive. The additive may include at least one of a binder or a diluent, or may be a mixture thereof. When the additive contains the diluent, this may perform the function of maintaining the shape of a block in the operation of the compressor 500 which will be described later, because the diluent is not cured. Since this is also used in a subsequent smelting process, the removal of the diluent is unnecessary. As an example of the diluent, de-aromatic hydrocarbon may be used. Here, the diluent serves to dilute extractant when valuable metal is subsequently recovered.

The mixer 400 may be coupled to communicate with an additive supply part 401 so as to supply the above-described additive. At this time, the mixer 400 may be controlled to have a preset mixing amount and a preset mixer rpm.

When the diluent is mixed with the binder, the preset mixing amount may range from 5 to 30%. When the mixing amount is less than 5%, it becomes difficult to prepare slurry. When the mixing amount is more than 30%, it becomes difficult to maintain a block shape during the molding of the compressor 500 which will be described later.

In addition, the mixer 400 may be controlled in the preset mixer rpm. The preset mixer rpm may be controlled in the range of 100 to 500 rpm. When the mixer rpm is less than 100 rpm, mixing may become non-uniform. When the mixer rpm is more than 500 rpm, it becomes difficult to control the amount of the slurry supplied to the compressor 400.

Furthermore, clay which is the mixture of dust and additive mixed in the mixer 400 may be stored in a receiving member 410 which is disposed under the mixer 400. After the mixture is temporarily stored in the receiving member 410, it may be pressed by a separately installed transfer part 420 and then be transferred to the compressor 500 which will be described later.

Here, the transfer part 420 may use a double acting cylinder which may be reciprocated to press the receiving member 410. Since various means capable of transferring the receiving member 410 towards the compressor 500 may be used, the present disclosure is not limited thereto.

The compressor 500 may include an upper member 520 which is disposed at an upper position to reciprocate up and down and thereby compress dust, and a lower member 510 which is disposed on an opposite side of the upper member 520 to support dust from a lower position. At this time, the molding pressure of the compressor 500 may range from 0.5 to 3.0 t/cm². When the molding pressure of the compressor 500 is less than 0.5 t/cm², molding failure may occur. When the molding pressure of the compressor 500 is more than 3.0 t/cm², a secondary process may not naturally occur.

That is, as described above, a solid block B having a predetermined volume may be formed by applying a compressive force to the upper and lower sides of the clay mixture.

Therefore, the present disclosure provides an apparatus for processing a waste battery, which is configured such that the dust of pulverized waste battery flows through a collector and a filter part communicating directly with each other to a mixer, thus preventing the dust from being scattered to the surroundings, and thereby improving poor a working environment caused by fine dust generated during a process.

Further, since dust passing through a collector and a filter part is mixed with an additive in a mixer, a cohesive force can be improved.

Furthermore, if a diluent is added as an additive, the diluent required for a subsequent process is used to prevent dust, so the diluent can be used as it is without being removed in the subsequent process. In this case, the diluent prevents dust from occurring through power agglomeration, simultaneously formability can be increased, and the number of processes can be reduced because it is unnecessary to remove the diluent in the subsequent process.

Since dust agglomerated in a mixer is immediately compressed and formed into a block, a recovery process is facilitated to solve a low yield problem. In addition, since compressed blocks may be stacked, moving and sales thereof are easy.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. An apparatus for processing a waste battery, the apparatus comprising:
   a conveying unit having a conveying belt rotated by a plurality of rotating shafts which are rotated to convey the supplied waste battery in one direction;
   a pulverizer disposed on a position along a travelling direction of the conveying unit to pulverize the waste battery;
   a heater disposed on a downstream side of the pulverizer to heat dust formed by the pulverizer;
   a collector collecting the dust which passes through the pulverizer and the heater;
   a filter part filtering a pulverized material of the collector;
   a mixer supplying an additive to the dust discharged from a discharge pipe of the filter part; and
   a compressor compressing a mixture mixed in the mixer,
   wherein the collector is formed in a duct structure having an internal flow space above the pulverizer, the heater, and the filter part, and is provided with a branch pipe communicating with the pulverizer, the heater, and the filter part which are sequentially arranged in a longitudinal direction.

2. The apparatus of claim 1, wherein the compressor communicates with the mixer along a discharge pipe extending from the filter part.

3. The apparatus of claim 2, wherein the compressor comprises:
   an upper member disposed on an upper side and reciprocating up and down to compress the dust; and
   a lower member disposed on an opposite side of the upper member to support the dust from a lower side.

4. The apparatus of claim 1, wherein the mixer sprays an additive into the dust contained therein.

5. The apparatus of claim 4, wherein the additive comprises de-aromatic hydrocarbon.

6. The apparatus of claim 1, wherein the mixer is controlled to have a preset mixer rpm and a preset mixing amount.

7. The apparatus of, claim 6, wherein the compressor compressing the mixture at a preset pressure, and wherein the preset pressure ranges from 0.5 to 3.0 t/cm$^2$.

8. The apparatus of claim 6, wherein the preset mixing amount is a ratio of the additive to the dust, and the preset mixing amount ranges from 5 to 30%.

9. The apparatus of claim 6, wherein the preset mixer rpm ranges from 100 to 500 rpm.

* * * * *